US006874276B2

(12) United States Patent
Morrison

(10) Patent No.: US 6,874,276 B2
(45) Date of Patent: Apr. 5, 2005

(54) CAGE FOR VINE CROPS

(76) Inventor: Mildred G. Morrison, 5115 Greenway Dr., North Little Rock, AR (US) 72116

( * ) Notice: Subject to any disclaimer, the term of this patent is extended or adjusted under 35 U.S.C. 154(b) by 12 days.

(21) Appl. No.: 10/435,638

(22) Filed: May 12, 2003

(65) Prior Publication Data

US 2004/0237393 A1   Dec. 2, 2004

(51) Int. Cl.[7] .......................... A01G 9/12; A01G 17/04
(52) U.S. Cl. ................. 47/45; 47/44; 47/32.4; 47/39; 248/27.8; 220/485
(58) Field of Search ................ 47/45, 44, 70, 47/47, 32.4, 39; 248/27.8; 220/485; A01G 9/12, A01G 17/04

(56) References Cited

U.S. PATENT DOCUMENTS

| | | | | |
|---|---|---|---|---|
| 414,175 A | * | 10/1889 | Whittaker | 47/32.4 |
| 1,112,558 A | * | 10/1914 | Red | 248/129 |
| 3,013,758 A | * | 12/1961 | Smith | 248/153 |
| 3,088,245 A | * | 5/1963 | Menge | 47/47 |
| 3,481,075 A | * | 12/1969 | Dastoli et al. | 47/41.01 |
| 4,372,351 A | * | 2/1983 | Myers | 140/112 |
| 5,174,060 A | * | 12/1992 | Glamos | 47/45 |
| 6,119,393 A | * | 9/2000 | Wourms et al. | 47/39 |
| 6,269,588 B1 | * | 8/2001 | Ito | 47/39 |
| 2003/0033750 A1 | * | 2/2003 | Gunderman et al. | 47/45 |
| 2003/0066233 A1 | * | 4/2003 | Gunderman et al. | 47/45 |

FOREIGN PATENT DOCUMENTS

FR   2614774 A1   *   5/1987
GB   1452430        *   11/1974

* cited by examiner

*Primary Examiner*—Robert P. Swiatek
*Assistant Examiner*—Andrea M. Valenti
(74) *Attorney, Agent, or Firm*—Dennis B. Haase

(57) ABSTRACT

A cage for supporting a growing fruit or vegetable vine comprising a series of concentric rings of ever increasing diameter wherein the rings are secured to a pair of opposed continuous wire loops having legs at the free end to be pushed into the ground, and a handle at the upper extremity of each loop above the cage to facilitate handling.

1 Claim, 1 Drawing Sheet

CAGE FOR VINE CROPS

The present invention relates generally to devices for supporting vine crops, e.g., tomatoes, during growth, and more particularly to a novel cage within the confines of which a vine can grow and be nurtured, and the fruit harvested without damage to the plant.

BACKGROUND OF THE INVENTION

1. Field of the Invention

Gardening has grown from a hobby or pass time to a cottage industry. Whether in a commercial nursery or in a residential back yard, folks have strived to grow large, unblemished fruits and vegetables.

Not too many years ago, conventional wisdom in the growing of, for example, tomatoes, was to pound a stake in the ground, and, as the plant grew, tie it to the stake. Sometimes it worked, but often as not, because of the improvements in the plant species, the vine became bruised, strangled and even broken at the tie point because the size and weight of the fruit. As a consequence, the crop was significantly less in both size and quality, than the effort that went into growing it would otherwise be anticipated.

While it is true that stakes are still the mainstay of the grape industry, they remain effective because the grape cluster does not grow on the vine stem, but rather on shoots, or canes, which extend outwardly from the upper reaches of the stem itself, often for a length of six feet. Thus, cross wires and bars are provided on the stake to support the fruit bearing extension of the vine.

2. Overview of the Prior Art

The inherent deficiencies of the venerable stake were not lost on growers of tomatoes and like crops. As early as 1889, Richards patented (U.S. Pat. No. 417,838) a modified stake configuration by adding a wire coil 2 circumscribed about a central stake 1. For whatever reason, the Richards device did not achieve great success.

In 1935 U.S. Pat. No. 2,000,911 issued to Balousek. It was for a plant support in which one or more wires were strung from a stake, providing for some loops to support a growing plant.

In 1951 Smith was granted a (U.S. Pat. No. 2,577,373) on a 1945 application for what was termed a "Garden Trellis". Perhaps inspired by the "slinky" which emerged from World War II, the trellis was an hourglass shaped spring which was anchored in the soil. A vine or tree bearing fruit or vegetables grew within the confines of the trellis. Bork U.S. Pat. No. 4,860,489 is similar to Smith, with the exception that there are vertical legs extending to the top of a cylindrical coil 12. Glamos U.S. Pat. No. 5,174,060 is yet another patent teaching a cylindrical coil supported by legs which extend outwardly from one another.

Notwithstanding the prior attempts to achieve a useable plant support, in 1995 yet another patent in the field issued to Allison. U.S. Pat. No. 5,412,905 issued for a Tomato Green House in which an inverted conical frame supported a wrap, which is similar to the now familiar bubble wrap. The bubble wrap magnified the suns rays on a plant growing within the frame, thus providing a greenhouse effect.

Hillestad, in his U.S. Pat. No. 5,179,799 issued in 1993 is yet another variation on the cone of Allison, the difference being that the horizontal rings 15, 16, and 17 are removable.

As is evident from the substantial number of patented efforts to find an ideal growing cage for vine plants, one has not yet met all of the needs of the market, or at least not until now.

SUMMARY OF THE INVENTION

In order to be both functional and practical in this relatively crowded art, a growing cage for vine type fruits and vegetables, the cage must be economical, stackable, easily installed, removed and handled by the user, all while offering support for today's hybrid plants, without impairing access to the fruits or vegetables.

It is, therefore, a principal objective of the present invention to meet and exceed all of the criteria for a growing cage suited for vine crops such as tomatoes.

It is a further objective ancillary to the foregoing to provide a growing cage which is exceptionally easy to secure in the soil, remove, reposition as necessary or desirable, and otherwise handle safely and with dispatch.

Yet another objective of the present invention is to accomplish all of the objectives attributable to it in a growing cage which is very economical to construct, store and handle so that it is within the reach of everyone from the garden hobbyist to the commercial grower.

The foregoing, as well as other objects and advantages of the present invention, will become apparent to those skilled in the art, when the accompanying Detailed Description of a Preferred Embodiment is read in conjunction with the accompanying sheet of drawings, wherein:

DETAILED DESCRIPTION OF A PREFERRED EMBODIMENT

Figures 1, 2, 3:
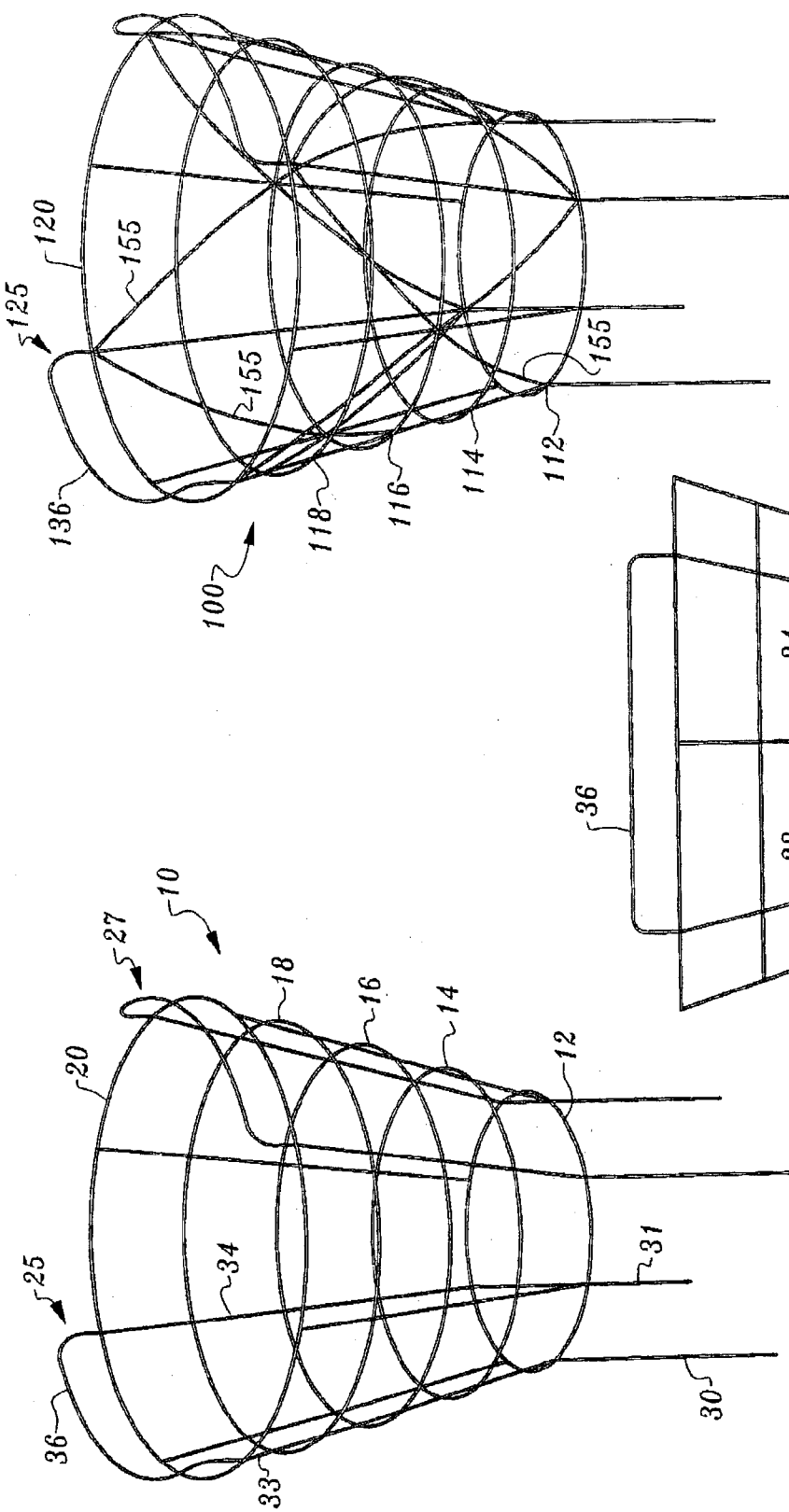
FIG. 1 is a perspective of a growing cage of the present invention providing an overall view thereof.
FIG. 2 is an enlarged side elevation of a portion of the growing cage of FIG. 2; and, FIG. 3 is a perspective view of an alternative embodiment of a growing cage embodying the principals of the growing cage of FIG. 1, but adding strengthening features to accommodate larger plants.

With reference now to the drawings, and initially to FIG. 1, a growing cage constructed in accordance with the present invention is denominated as 10. The cage 10 is formed with a series of concentric rings 12, 14, 16, 18 and 20 disposed in a vertical column, the precise number of which may vary with the vine plant to be grown. The rings are preferably uniformly spaced, although they may be spaced in any fashion which will accommodate their particular use. Spacing is governed, at least to a substantial extent, by the size of the fruit or vegetable to be harvested from the vine, it being important that the harvest can be accomplished by reaching between rings to remove the harvest without damage to either the fruit or the vine.

Further in keeping with the invention, each ring increases in diameter with each successive ring beginning with the lower ring 12 which is the smaller of the set, and an upper ring 20 being the largest in diameter. It will also be appreciated that the precise number of rings may be varied to fit a particular need without departure from the underlying principals of the invention.

In order, in accordance with the invention, to provide both support, and coincidently, greatly improved handling of the growing cage 10, support members, a pair of which are at 25 and 27, are provided. In order to achieve proper balance and structure, the supports are disposed in opposed relationship to one another, and each support member is a continuous wire loop in the general shape of an inverted "U", in which a pair of lower support legs 30 and 31, are suitable for insertion into soil about the vine to be supported. Each of the legs 30, 31 merge into outwardly flared center sections 33, 34.

Each such support member, in accordance with an important objective to be accomplished by the invention, terminates in an integrally formed handle section 36, above said center sections. The handle is disposed above the upper ring 20, which is, in the preferred embodiment, the largest diameter ring, in order that those who would position, set, remove and store the growing cage are provided with a fast, convenient and safe griping area with which to manipulate each cage through each of the maneuvers which the purposes of the invention require.

The handle 36 completes the loop which comprises each support member 25, 27 and provides the appropriate spacing between the center sections 33, 34 and the extended portions thereof which are the legs 30 and 31.

Each support member 25, 27 is soldered or otherwise affixed to each of the rings 12–20, in any well known manner to define once so affixed, a growing cage with exceptionally functional character.

The structure of FIG. 1 provides good support for the elements which comprise the cage, permitting higher gages of wire to be used. However, it is anticipated that under certain circumstances, additional structural integrity may be called for. To this end, the structurally strengthened cage 100 illustrated in FIG. 3 offers a practical solution. Rings 112, 114, 116, 118 and 120 are supported by support members 125 and 127, and each support member terminates in a handle 136, in essentially the same manner as the cage of FIG. 1.

In keeping with the need for additional structural integrity where the vine to be caged is either larger and more expansive, and/or the fruit it bears is heavier than normal, a plurality of structural supports in the form of auxiliary wires 155 are provided and so oriented as to form triangles at the point of intersection with the rings 112–120, to thereby add the requisite additional strength to the cage.

Having now described, in considerable detail, the structure and purpose of the growing cage of the present invention, and a variation on that theme, and with the clear understanding that some variation in the specific structure is within the contemplation of the invention.

What is claimed is:

1. A growing cage for support of vine type plants from planting to completion of harvest comprising:

a series of concentric rings, said rings being disposed in a vertical column;

at least two support members, each said support member comprising an inverted U-shaped configuration, each said support member comprising a pair of support legs;

said support legs merging into center sections, said series of concentric rings attach to said center sections, and each said support member terminating in a handle above said center sections;

each support leg terminating in free end portions adapted for insertion into ground for support of said growing cage;

said handle being integral with said legs so that the force of inserting and withdrawing from the soil is not transferred to said concentric rings;

at least two pairs of auxiliary structural support wires;

each pair of said wires attaches to both of said at least two support members;

wherein each wire of said pair of wires crossing one other in a diagonal fashion at a location between said support members.

* * * * *